United States Patent [19]

Shiratori

[11] Patent Number: 4,664,337

[45] Date of Patent: May 12, 1987

[54] CASSETTE TAPE RECORDING AND/OR REPRODUCING APPARATUS ACCOMMODATING CASSETTES OF DIFFERENT SIZES

[75] Inventor: Kazuhide Shiratori, Kanagawa, Japan

[73] Assignee: Sony Corporation, Tokyo, Japan

[21] Appl. No.: 637,954

[22] Filed: Aug. 6, 1984

[30] Foreign Application Priority Data

Aug. 12, 1983 [JP] Japan .................. 58-148214

[51] Int. Cl.⁴ .............................. G11B 15/00
[52] U.S. Cl. ........................ 242/199; 360/94
[58] Field of Search ............ 360/94, 137, 93; 242/199, 200, 201

[56] References Cited

U.S. PATENT DOCUMENTS

| | | | |
|---|---|---|---|
| 3,666,207 | 5/1972 | Swain | 360/94 X |
| 3,964,099 | 6/1976 | Sato | 360/94 |
| 4,216,509 | 8/1980 | Sato et al. | 360/94 |
| 4,490,757 | 12/1984 | Mogi | 360/94 |

Primary Examiner—Robert S. Tupper
Assistant Examiner—Andrew L. Sniezek
Attorney, Agent, or Firm—Eslinger, Lewis H.; Alvin Sinderbrand

[57] ABSTRACT

A cassette tape recording and/or reproducing apparatus has a pair of movable reel tables, the center distance between which is automatically so adjustable as to coincide with the center distance between the reels of any tape cassette optionally selected from various types of tape cassettes.

7 Claims, 10 Drawing Figures

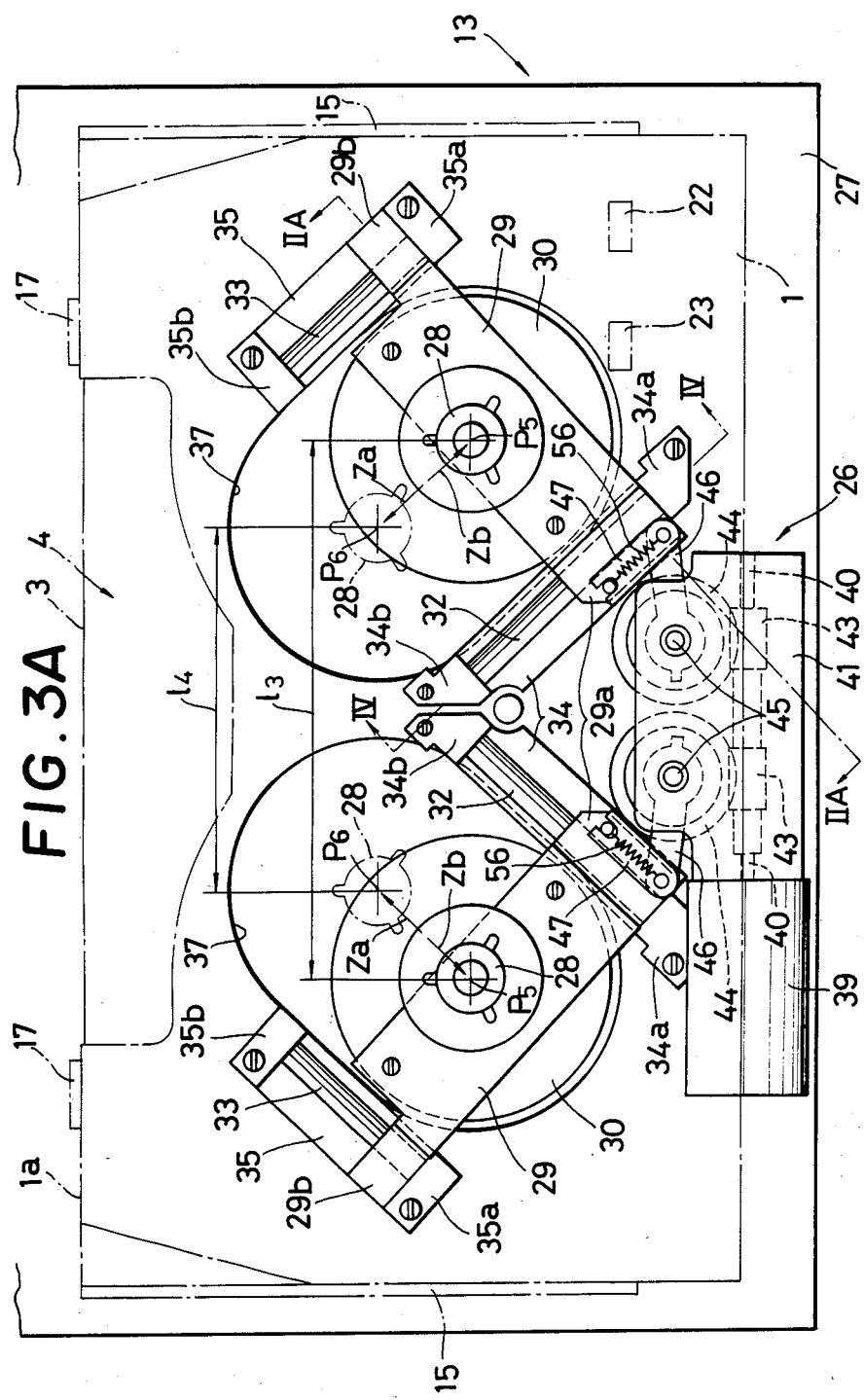

CASSETTE TAPE RECORDING AND/OR REPRODUCING APPARATUS ACCOMMODATING CASSETTES OF DIFFERENT SIZES

BACKGROUND OF THE INVENTION

1. Field of the Invention

The present invention relates to a cassette tape recording and/or reproducing apparatus suitably applied to a cassette video tape recorder or the like, and particularly, to a cassette tape recording and/or reproducing apparatus used for a plurality of types of tape cassette whose distances between the centers of respective pairs of reels differ from one another.

2. Description of the Prior Art

A conventional adapter system has been proposed for the cassette video tape recorder to be used for a plurality of types of tape cassette having different distances between the centers of respective pairs of reels. This adapter system is such that a small cassette having a small center distance between reels is set in an adapter having the same size as a standard cassette, whose center distance between reels is larger, and mounted in the cassette video tape recorder through the adapter, and thus the small cassette can be recorded/reproduced by the cassette video tape recorder used for the standard cassette.

However, according to this conventional adapter system, the adapter is an extra piece of equipment, and it results in raising considerably the cost of production. In addition, when the small cassette is set in the adapter, many cumbersome manual operations for setting are necessary such as positioning of the small cassette in the adapter, opening and locking of its front lid and pulling-out of a tape from the cassette for mounting it on a take-up arm and guide pin. It is very troublesome for a user to set the small cassette in the adapter, and it results in prolonging the setting time and causing inconvenience to him. Further, when the adapter system is used, it is impossible to use such an automatic cassette changer as to mount optionally any of the small and standard (large) cassettes in the video tape recorder.

OBJECTS AND SUMMARY OF THE INVENTION

The present invention has been made to overcome the conventional drawbacks, and has an object to provide a cassette tape recording and/or reproducing apparatus capable of optionally recording in and/or reproducing from any of a plurality of types of tape cassette having different distances between centers of respective pairs of reels without any special unit such as an adapter.

In accordance with an aspect of this invention, in a cassette tape recording and/or reproducing apparatus capable of mounting optionally any of various types of tape cassette, each center distance between a pair of reels of which differs from one another, the apparatus comprises a pair of reel tables capable of engaging with and driving said pair of reels, respectively; detecting means to discriminate the type of tape cassette when the tape cassette is to be mounted; and means for moving said pair of reel tables to adjust the center distance therebetween with the results obtained from said detecting means, and thereby the center distance between said pair of reel tables is adjusted in accordance with any mounted one of said various types of tape cassette.

BRIEF DESCRIPTION OF THE DRAWINGS

FIGS. 1A to 6 show an embodiment wherein the present invention is applied to a cassette video tape recorder, in which:

FIGS. 1A and 1B are horizontal sectional views respectively for illustrating center distances between the respective pairs of reels of a standard and small cassettes in the state of being inserted in a cassette holder;

FIGS. 3A and 3B are plan views of a video tape recorder body for explaining adjusting operation of center distances between a pair of reel tables;

FIG. 4 is a sectional view taken along line IV—IV of FIG. 3A;

FIG. 6 is a sectional view taken along the line VI—VI of FIG. 5B.

DETAILED DESCRIPTION OF A PREFERRED EMBODIMENT

A cassette video tape recorder according to an embodiment of the present invention will be described with reference to the accompanying drawings.

The cassette video tape recorder according to the present invention can be used optionally for two types of cassette tape (which are respectively referred to as large and small cassettes hereinafter) having dfferent center distances between reels.

Figure 1A:
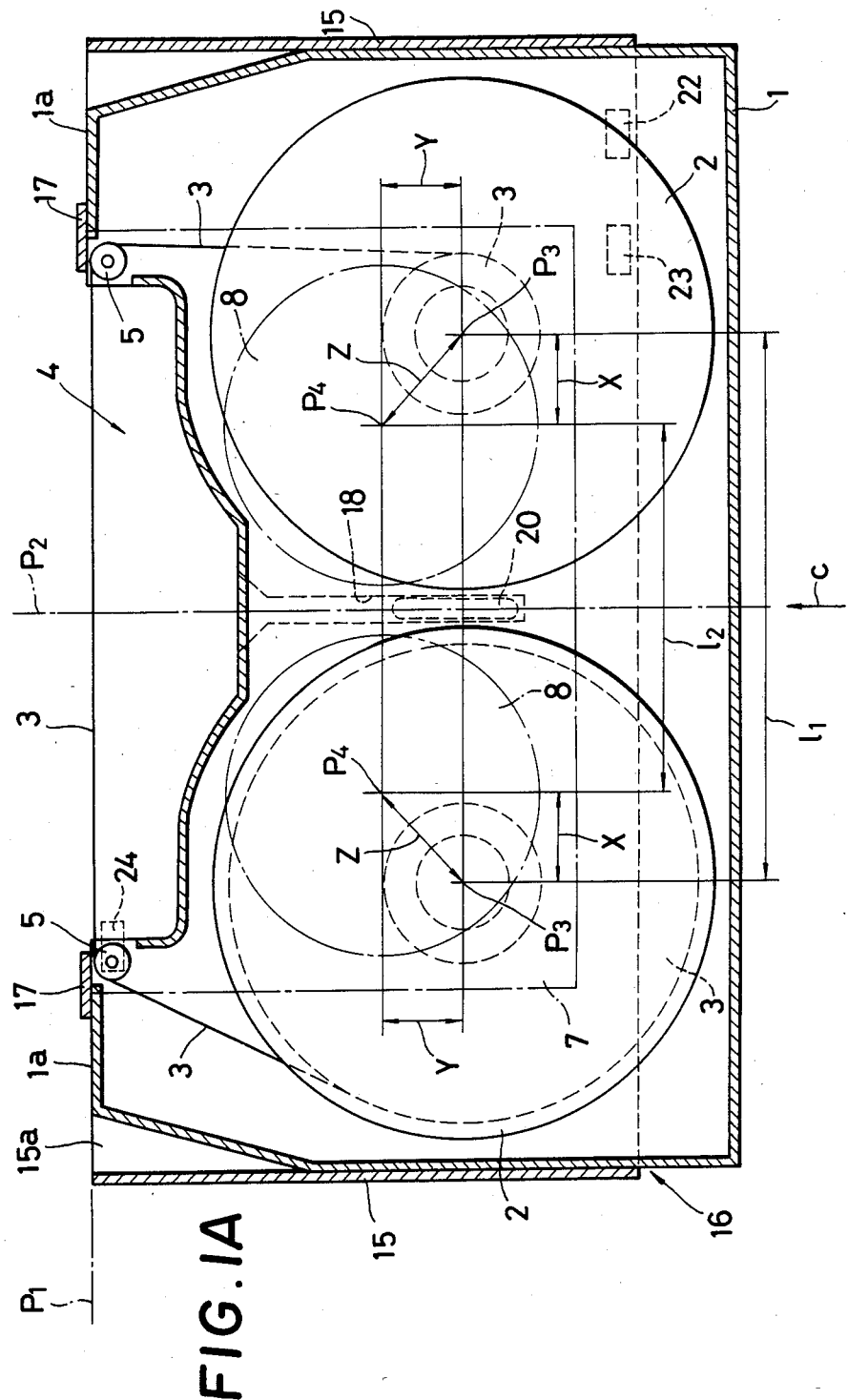

Firstly as shown in FIG. 1A, a large cassette 1 has a pair of right and left large reels 2, which have a pair of flanges respectively at the upper and lower ends of reel hubs, around which a magnetic tape 3 is wound. An opening 4 for loading the magnetic tape 3 is so formed at substantially the central portion of the cassette as to extend from a front end face 1a to a bottom surface 1b. The magnetic tape 3 is guided by a pair of guide rollers 5 disposed at the right and left sides of the opening 4 and run along the opening 4.

Figure 1B:
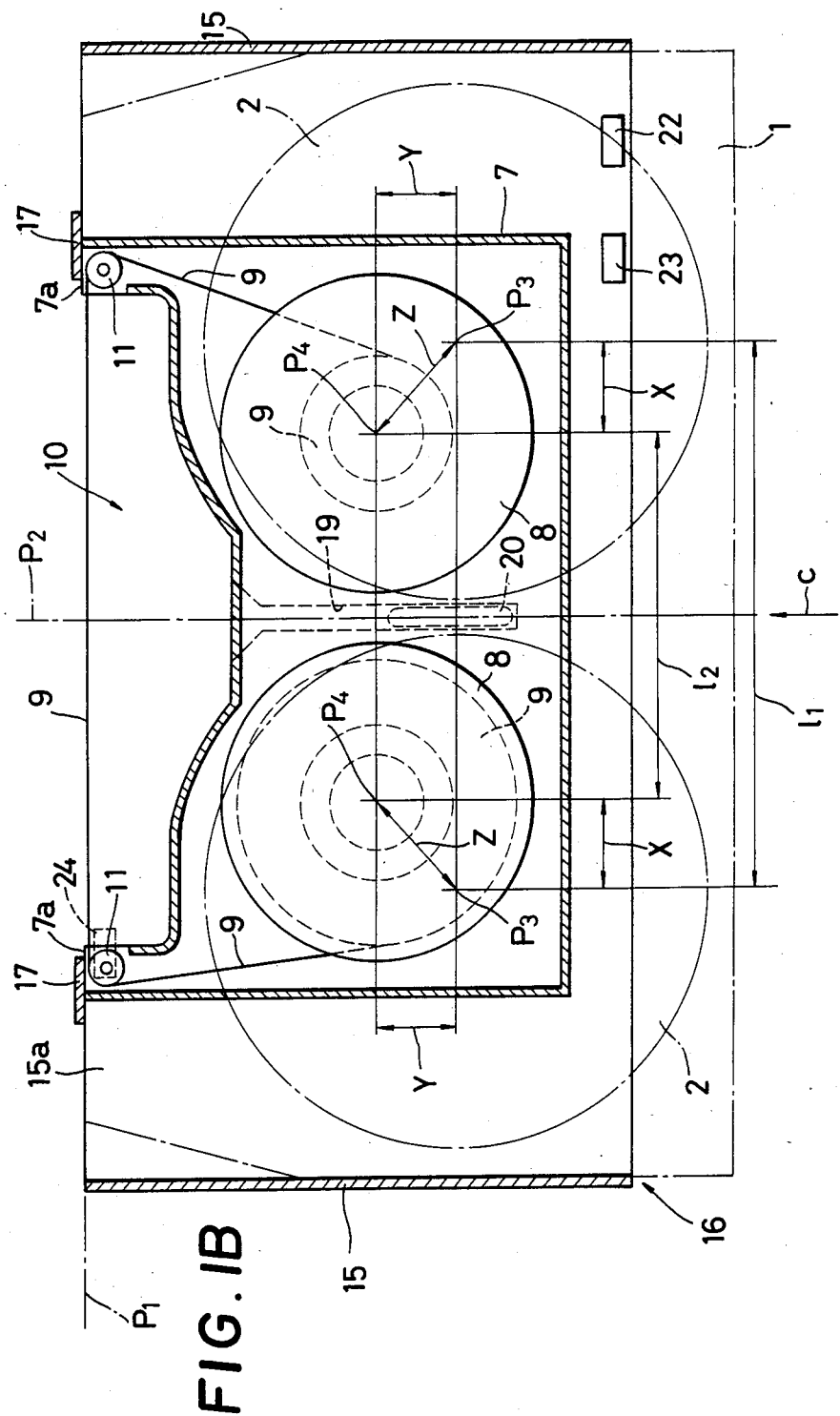

Secondly as shown in FIG. 1B, a small cassette 7 has a pair of right and left small reels 8, which also have a pair of flanges respectly at the upper and lower ends of reel hubs, around which a magnetic tape 9 is wound. Similarly to the large cassette 1, an opening 10 for loading the magnetic tape 9 is so formed at substantially the central portion of the cassette as to extend from a front end face 7a to a bottom surface 7b. The magnetic tape 9 is guided by a pair of guide rollers 11 disposed at the right and left sides of the opening 10 and runs along the opening 10.

Accordingly, distance $l_1$ between the centers of the large reels 2 of the large cassette 1 is larger than distance $l_2$ between the centers of the small reels 8 of the small cassette 7. The openings 4, 10 of the large and small cassettes 1, 7 are arranged for tape loading, so that both openings 4, 10 are the same in shape and in size.

When the cassette 1, 7 is inserted in the cassette video tape recorder, a tape loading guide (not shown) or the like is inserted into the opening 4, 10. When the cassette 1, 7 is completely loaded in the cassette video tape recorder, the tape loading guide moves out of the cassette 1, 7, so that the magnetic tape 3, 9 is pulled out by the tape loading guide and brought into a predetermined tape travel path outside the cassette 1, 7. Therefore, when the cassette 1, 7 is inserted in the video tape recorder, its front and central lines $P_1$, $P_2$ must always occupy the same positions, and then x- and y-coordinates of centers $P_3$ of the large reels 2 of the large cassette 1 do not conincide with those of centers $P_4$ of the small reels 8 of the small cassette 7, as shown in FIGS. 1A and 1B.

In the cassette video tape recorder according to the present invention, the types of cassette 1, 7 (which are referred to as the sizes of the cassette hereinafter) are detected, when any of the cassettes 1, 7 are optionally to be loaded therein, and thereby right and left reel tables are moved along Z lines, that is, lines symmetrically inclined against each other so as to be able to fit the centers $P_3$, $P_4$ of the reels 2, 8 to those of the right and left reel tables.

The detection of the sizes of the cassette 1, 7 and a space adjustment between reel tables mechanism is described below.

Firstly, a cassette loading mechanism 14 for loading a cassette in a video tape recorder body 13 will be discribed with reference to FIGS. 1A to 2B.

Figure 2A:
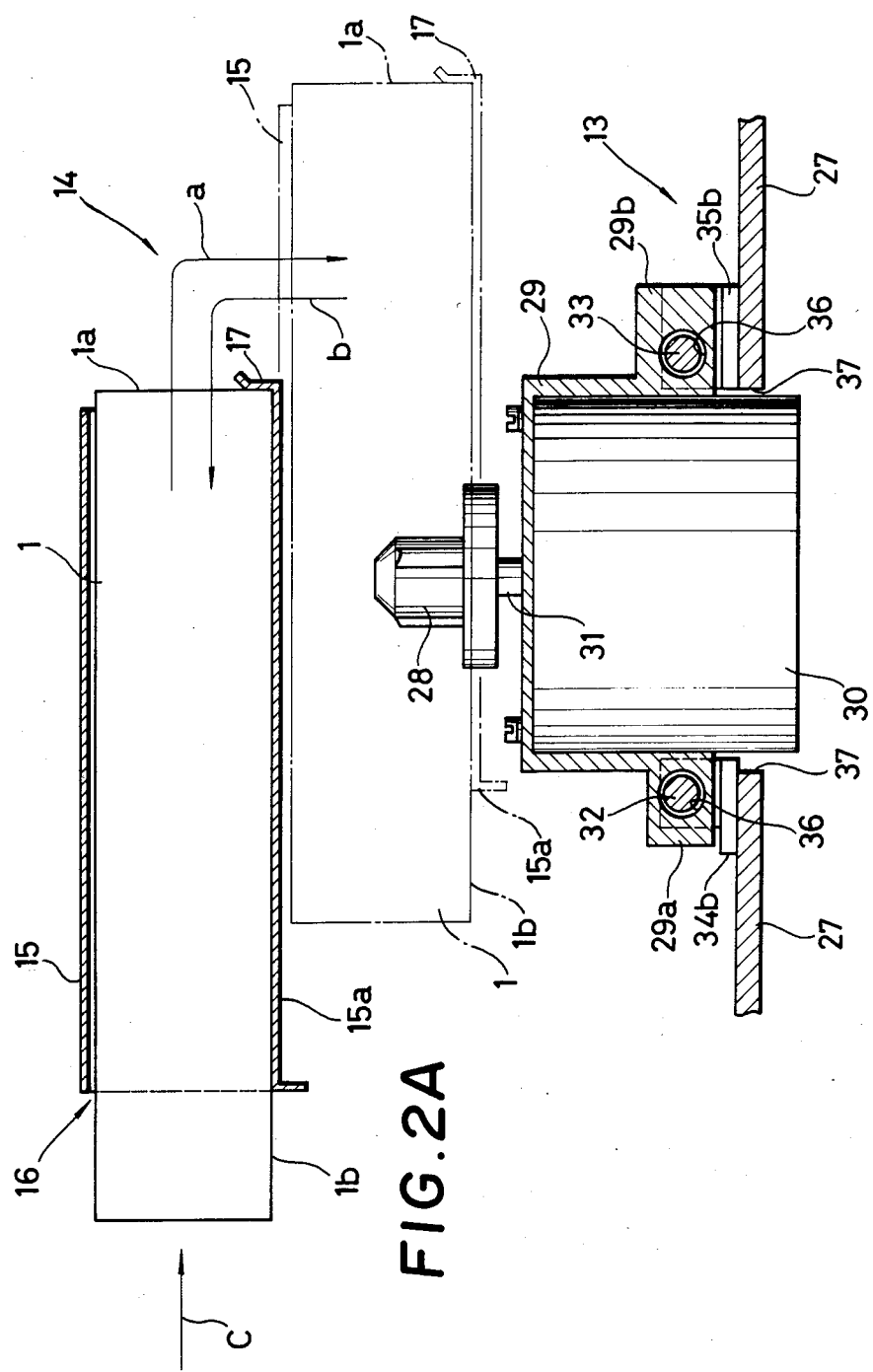
FIGS. 2A and 2B are vertical sectional views taken along lines IIA—IIA of FIG. 3A and IIB—IIB of FIG. 3B respectively for explaining loading operations of the standard and small cassettes in the cassette holder.
Figure 2B:
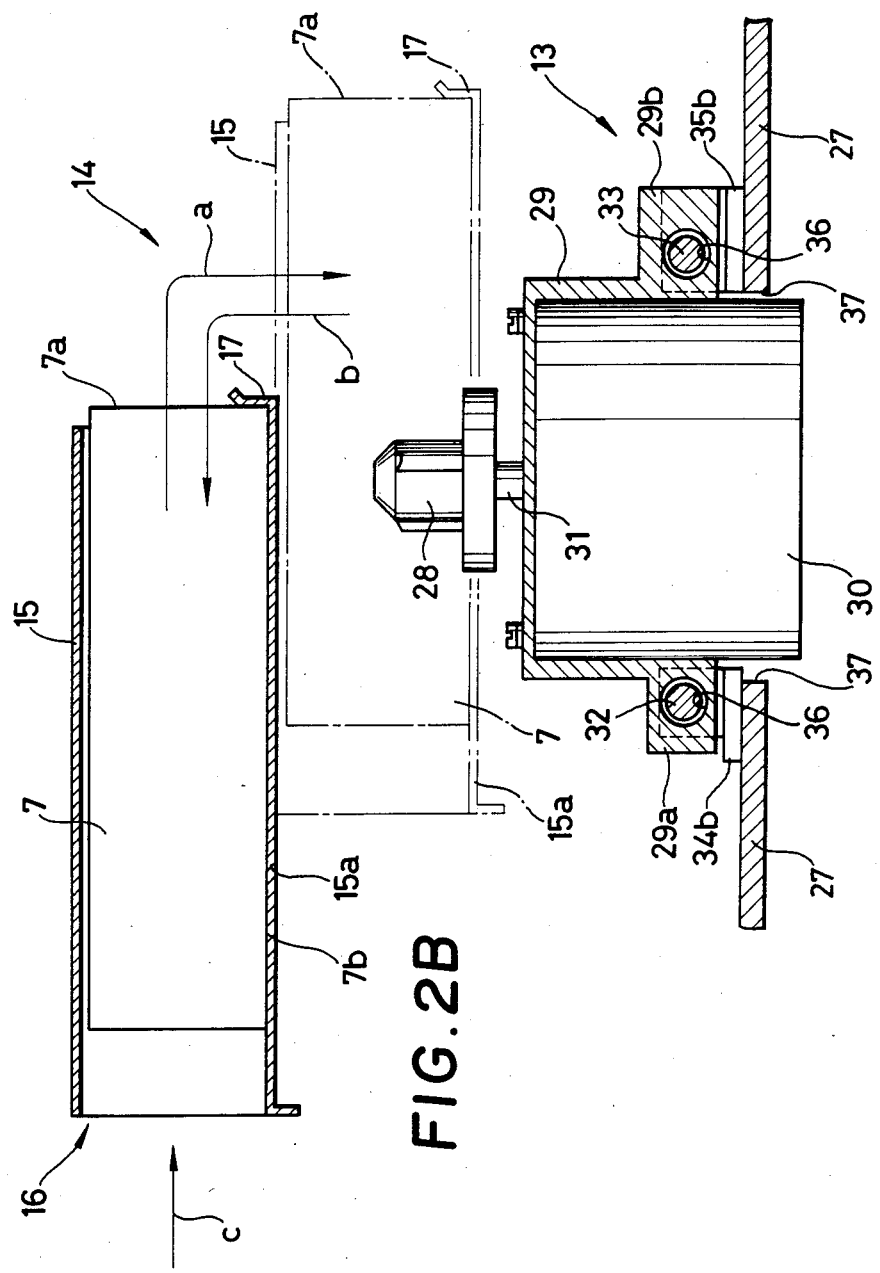

A cassette holder 15 in the cassette loading mechanism 14 is driven by a holder drive mechanism (not shown) between a cassette inserting position (an upper position), which is indicated by a solid line in FIGS. 2A and 2B and a cassette loading position (a lower position), which is indicated by an imaginary line, as indicated by arrows a and b.

As shown in FIGS. 1A and 1B, the cassette holder 15 has an inner size suitable for an outer size of the large cassette 1. At the cassette inserting position the cassette 1, 7 is inserted into the cassette holder 15 through a cassette insertion port 16 as indicated by arrow c, and the inserted cassette is held therein. The front end face 1a, 7a of the inserted cassette 1, 7 abuts against a stopper 17 which is disposed at a side of a bottom plate 15a of the cassette holder 15, that is, an opposite side where the cassette insertion port 16 is disposed. The front line $P_1$ of the cassette 1, 7 is located at a predetermined position irrespectively of the sizes of the cassette. A guide groove 18, 19 is formed in the bottom surface 1b, 7b along the central line $P_2$. When the cassette is inserted, an insertion guide 20 formed on the bottom plate 15a of the cassette holder 15 engages with the guide groove 18, 19, so that the centeral line $P_2$ of the cassette 1, 7 is located at a predetermined position.

As shown in FIGS. 1A and 1B, a pair of sensors 22, 23 are arragned on the bottom plate 15a (or on an upper plate), in the vicinity of the cassette insertion port 16 of the cassette holder 15 so as to detect the type of cassette inserted into the cassette holder 15 and generate such an electrical signal as to represent the type of detected cassette. A sensor 24 is arranged on the bottom plate 15a (or on the upper plate), in the vicinity of the stopper 17 of the cassette holder 15 so as to detect the completion of the cassette insertion process and generate such an electrical signal as to represent this completion. The sensors 22, 23 and 24 may comprise various types of switch such as contact switches (e.g. microswitches) and noncontact switches (e.g. photoelectric switches).

As shown in FIG. 1A, when the large cassette 1 is inserted in the cassette holder 15, both sensors 22 and 23 are turned on, but when the small cassette 7 is inserted in the cassette holder 15 as shown in FIG. 1B, the sensor 23 is only turned on. Thereby the size of the cassette inserted in the cassette holder 15 can be detected. Since the sensors 22 and 23 are arranged in the vicinity of the cassette insertion port 16 of the cassette holder 15, the size of the cassette can be detected at the time when the cassette 1, 7 is going to be inserted into the cassette holder 15. A drive motor of the space adjustment between reel tables mechanism is then immediately driven due to the electrical signals from the sensors 22 and 23.

Subsequently, when the cassettes 1, 7 is completely inserted in the cassette holder 15 and the sensor 24 is turned on, a drive motor (not shown) of the lift drive mechanism is driven in response to the electrical signal from the sensor 24. As shown in FIGS. 2A and 2B, the cassette holder 15 moves downward from the cassette inserting position to the cassette loading position as indicated by arrow a. Then the reels 2, 8 of the cassette 1, 7 engage with the right and left reel tables, respectively, as described in detail later, and thus the cassette 1, 7 optionally inserted and held in the cassette holder 15 is loaded in the cassette video tape recorder.

Secondly the space adjustment between reel tables mechanism 26 will be described with reference to FIGS. 2A to 6.

Figure 3B:
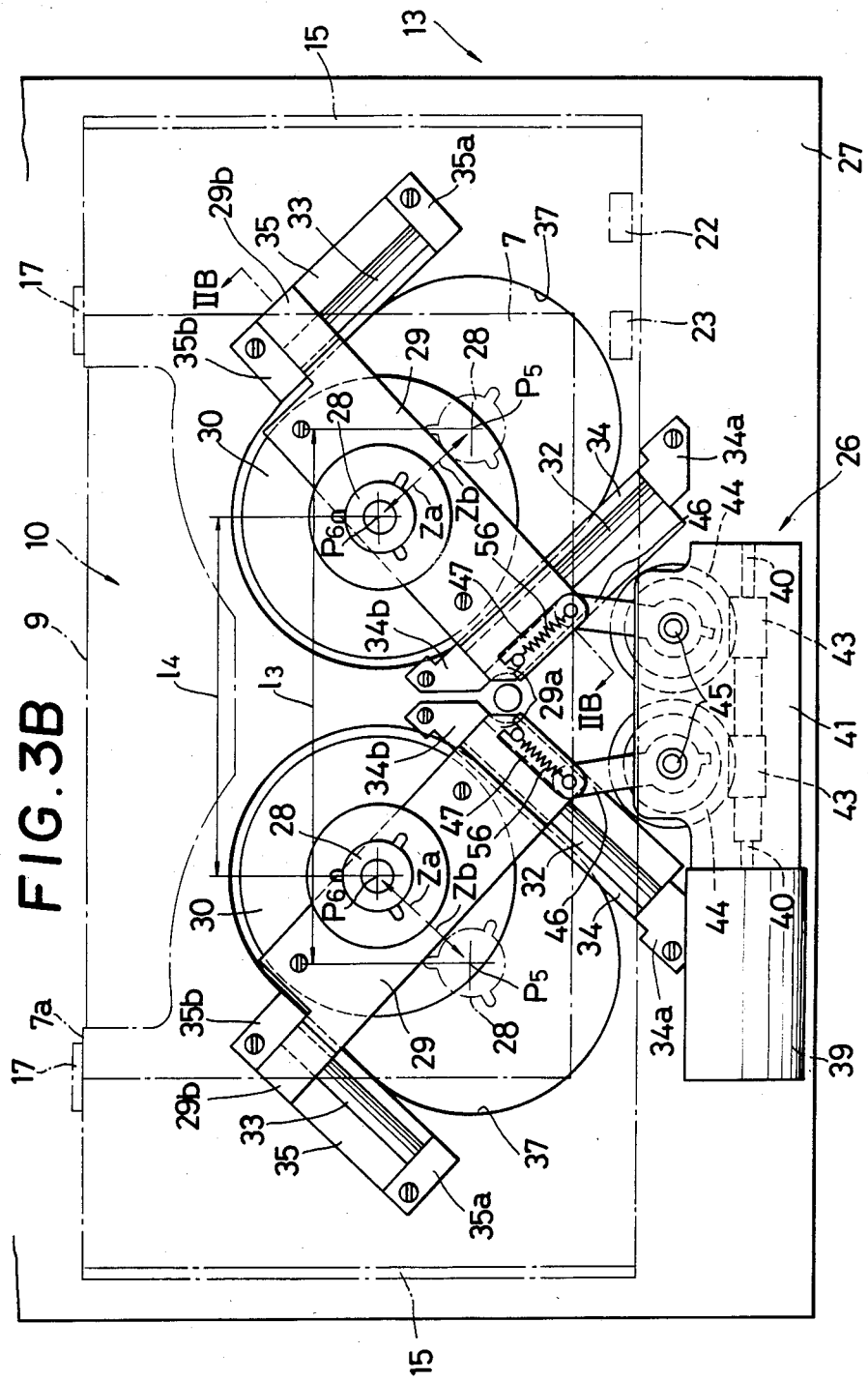

As shown in FIGS. 3A and 3B, the right and left reel tables 28 are mounted on a chassis 27 of the video tape recorder body 13. These reel tables 28 are moved between positions $P_5$ and $P_6$ as indicated by arrows Za and Zb, which positions $P_5$, $P_6$ respectively correspond to the positions of the centers $P_3$, $P_4$ as shown in FIGS. 1A and 1B. In other words, the reel tables 28 are adjusted so that the distances between the centers $P_5$, $P_6$ of the reel tables 28 are set in lengths $l_3$ and $l_4$, respectively.

Figure 4:
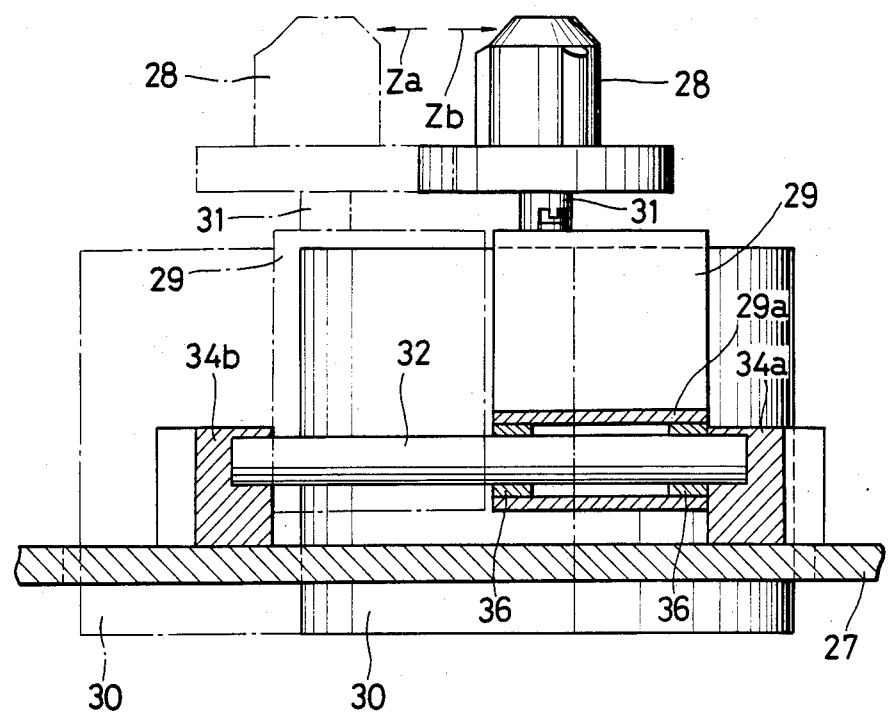

As shown in FIGS. 2A and 2B, a pair of reel motors 30 are mounted respectively in right and left substantially U-shaped sliding supports 29. Motor shafts 31 of the reel motors 30 extend vertically upward from the sliding supports 29, respectively. The right and left reel tables 28 are mounted on the upper end portions of the motor shafts 31. As shown in FIGS. 3A and 3B, a pair of guide shafts 32 and 33 are so arranged at both sides of each reel motor 30 as to extend parallel to arrows Za and Zb. As shown in FIG. 4, these guide shafts 32, 33 are horizontally supported by both end portions 34a, 34b and 35a, 35b of substantially U-shaped support tables 34, 35 which are secured to the chassis 27. As shown in FIGS. 2A, 2B and 4 the portions 29a, 29b of the sliding support 29 are slidably mounted on the guide shafts 32, 33 through metal bearings 36 which are fixedly fitted in the portions 29a, 29b of the sliding suport 29. Therefore, both these sliding supports 29 are guided respectively by the respective pairs of guide shafts 32, 33 and slid horizontally, so that both reel tables 28 may be moved horizontally between the positions $P_5$, $P_6$ thereof together with the reel motors 30 as indicated by arrows Za, Zb. In this case, the end portions 34a and 34b of the support table 34, for example, function as stoppers of the sliding support 29. Therefore, when one side of the end portion 29a of the sliding support 29 abuts against the end portion 34a of the support table 34 as shown in FIG. 3A, the center of the reel table 28 occupies the position $P_5$, and when the other side of the end poriton 29a of the sliding support 29 abuts against the end portion 34b of the support table 34 as shown in FIG. 3B, the center of the reel table 28 occupies the position $P_6$ Further, the lower end of the reel motor 30 is loosely fitted in and moved along an elongated hole 37 formed in the chassis 27.

Figure 5A:
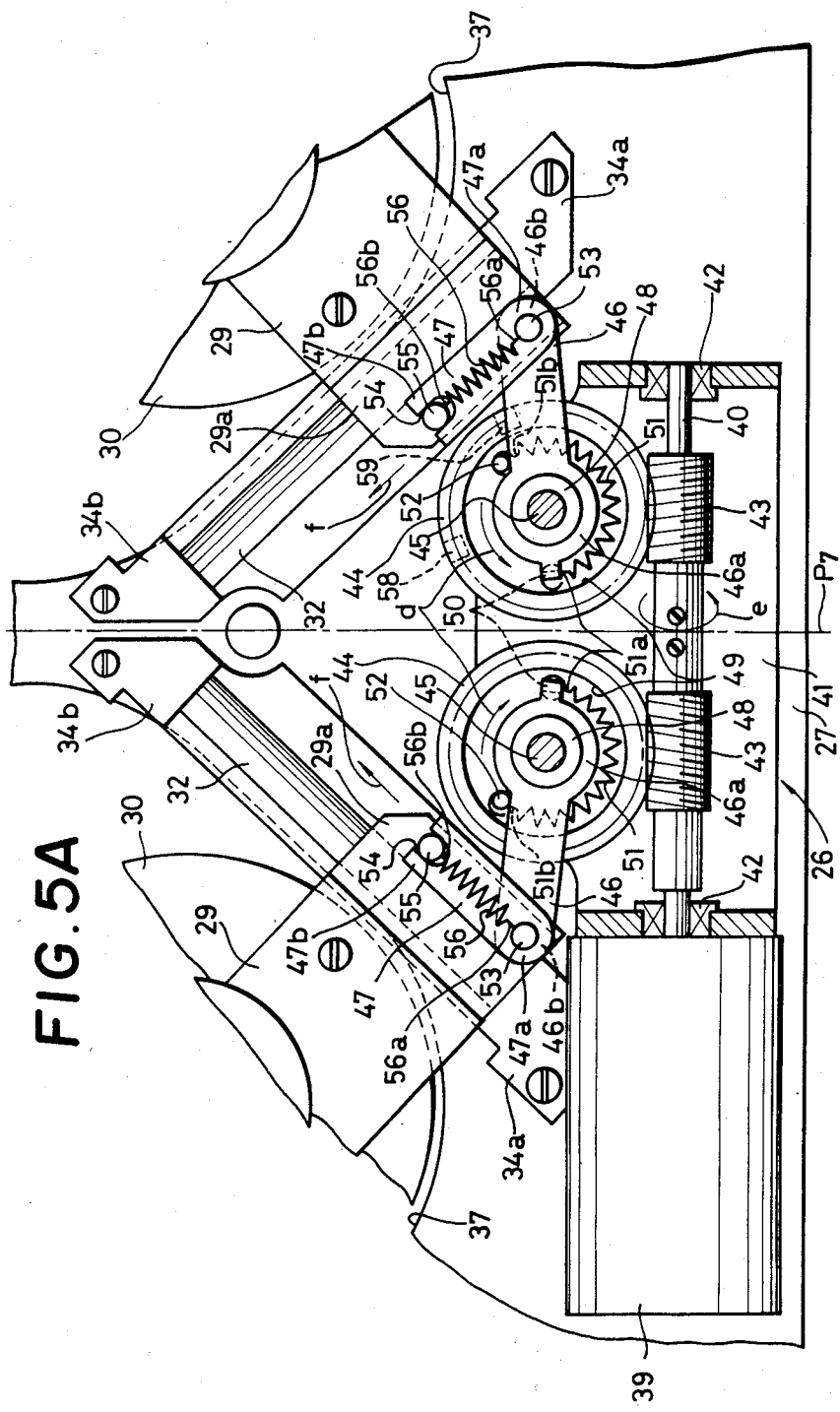
FIGS. 5A and 5B are enlarged partial cut-away plan views for explaining a space adjustment between reel tables mechanism.
Figure 5B:
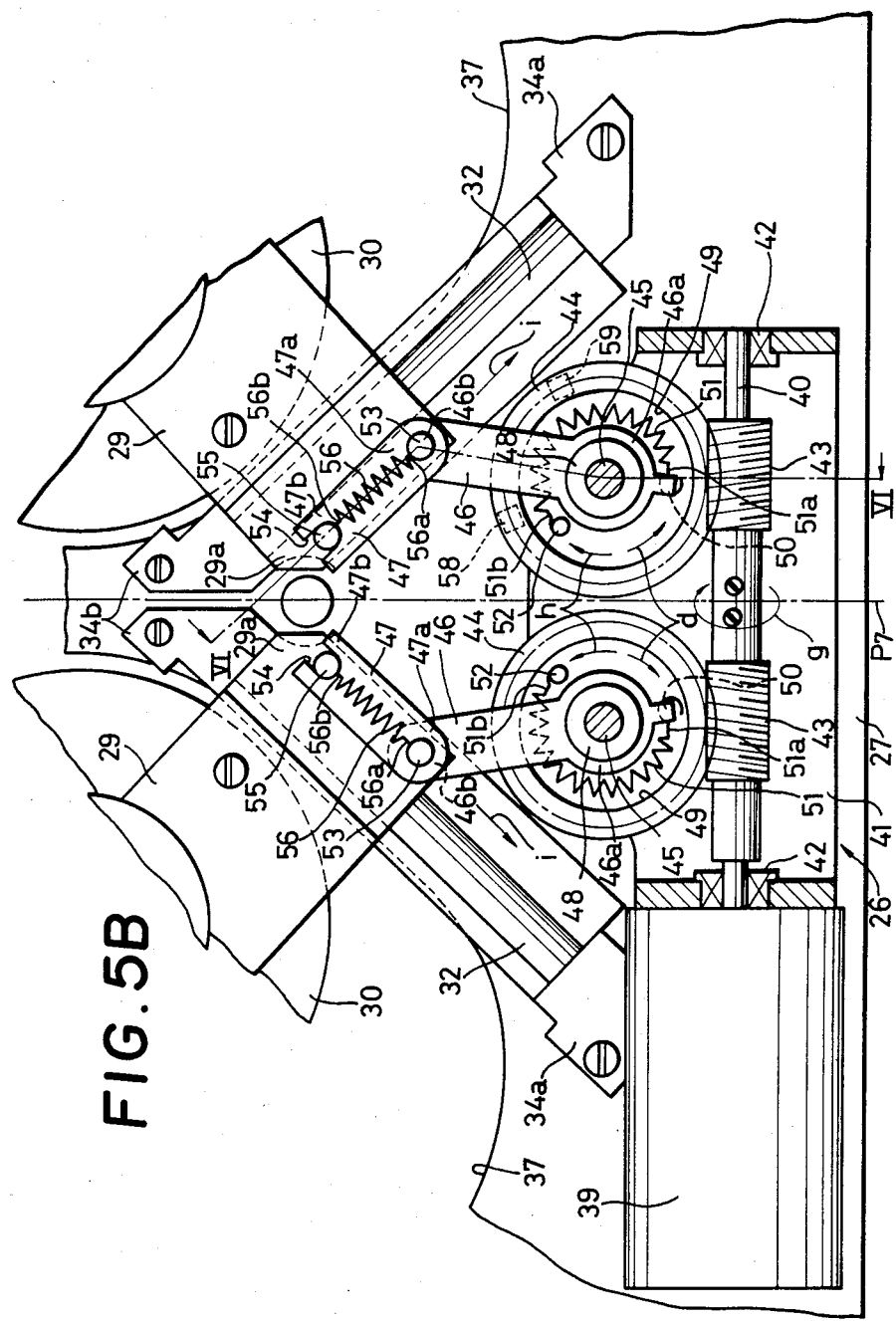

As shown in FIGS. 5A and 5B, a drive motor 39 is horizontally mounted on the chassis 27. A motor shaft 40 horizontally so extends from the drive motor 39 as to be rotatably supported by a pair of bearings 42 and inserted into a gear box 41 which is mounted on the chassis 27. A pair of worms 43 spaced apart from each other are secured to the motor shaft 40 and these worms 43 are threaded in directions opposite to each other. A pair of worm wheels 44 engaging with the worms 43 are rotatable on a pair of rotating shafts 45 vertically mounted in the gear box 41, respectivley. The worm wheels 44 are respectively coupled to the sliding supports 29 through corresponding pairs of drive arms 46 and 47. In this case, the motor shaft 40 is disposed perpendicular to a central line $P_7$ between the right and left reel tables 28. The worms 43 and worm wheels 44 are arranged with axial symmetry on the central line $P_7$ and also relative positions of the pairs of drive arms 46, 47 are symmetrically distributed about the central line $P_7$.

Figure 6:
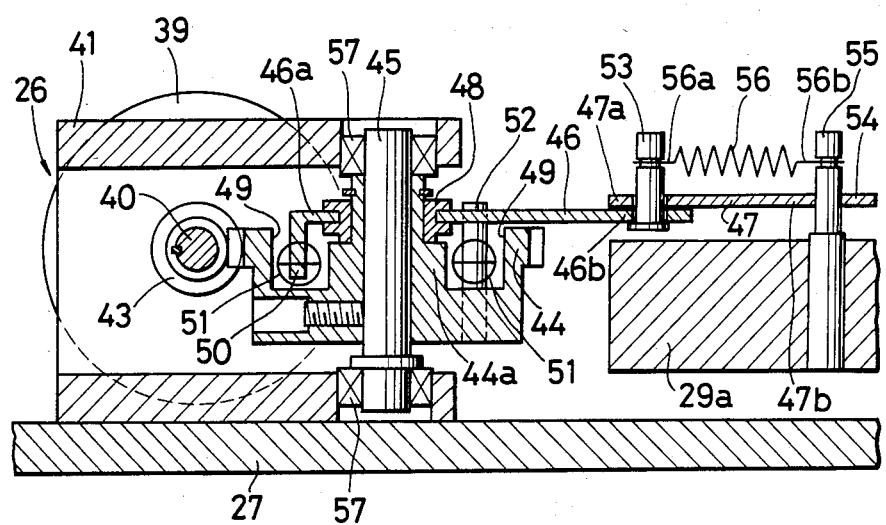

As shown in FIG. 6, the vertical rotating shaft 45 is rotatably supported at its two ends by the gear box 41 through a pair of upper and lower bearings 57, and the worm wheel 44 is fixed at the intermediate portion of this rotating shaft 45. A collar 48 is rotatably mounted on an upper end portion of the cylindrical boss portion 44a of the worm wheel 44, and one end 46a of the drive arm 46 is rotatably mounted on the collar 48. An annular recess 49 is formed on the boss portion 44a of the worm wheel 44, and a projection 50 vertically extending downward from one end 46a of the drive arm 46 is inserted in this annular recess 49. As shown in FIGS. 5A and 5B, a tension spring 51 bent into an arc is set in the annular recess 49 of the worm wheel 44. One end 51a of the tension spring 51 is coupled to the projection 50 of the drive arm 46, and the other end 51b of the tension spring 51 is coupled to a stop pin 52 disposed in the annular recess 49. Therefore, the drive arm 46 is biased as indicated by arrow d in FIGS. 5A and 5B against the worm wheel 44 by the tension spring 51, and further, the drive arm 46 abuts against the upper ends of the stop pins 52 so as not to move any further toward the direction indicated by arrow d. One end 47a of the drive arm 47 is rotatably mounted on a pivot pin 53 extending from the other end 46b of the drive arm 46. A slit 54 formed on the other end 47b of the drive arm 47 engages with a stop pin 55 disposed on one end poriton 29a of the sliding support 29. A tension spring 56 is arranged over and parallel to the drive arm 47, and both ends 56a, 56b of the tension springs 56 are coupled respectively to the pivot pin 53 and stop pin 55.

As shown in FIGS. 5A and 5B, a pair of rotational position sensors 58, 59 are arranged on the chassis 27 to detect the rotational position of the worm wheel 44 and thereby, on-off control of the drive motor 39 is secured. These sensors 58, 59 comprise the same switches as the sensors 22, 23 and 24.

The above-mentioned space adjustment between reel tables mechanism 26 is operated as follows.

As shown in FIG. 3A, when the reel table 28 is located at position $P_5$, and the large cassette 1 is inserted in the cassette holding 15 in such a manner as previously described, the drive motor 39 is not started even though the sensors 22 and 23 are turned on, and when the large cassette 1 is conveyed in the cassette loading position as indicated by the imaginary line in FIG. 3A by the cassette holder 15, each reel 2 of the large cassette 1 is mounted on the reel table 28.

Similarly, as shown in FIG. 3B, when the reel table 28 is located at position $P_6$, and the small cassette 7 is inserted in the cassette holder 15 in the same manner as previously described, the drive motor 39 is not started even though sensor 23 is turned on, and when the small cassette 7 is conveyed in the cassette loading position as indicated by the imaginary line in FIG. 3B, each reel 8 of the small cassette 7 is mounted on the reel tables 28.

However, as shown in FIG. 3A, when the center of the reel table 28 is located at position $P_5$, the small cassette 7 is inserted in the cassette holder 15, the drive motor 39 is driven to move the tables 28 as indicated by arrow Za due to a signal from the sensor 23 which is turned on.

In this case, as shown in FIG. 5A, the motor shaft 40 of the drive motor 39 is rotated in the direction indicated by arrow e and the right and left worm wheels 44 are rotated by the same amount of rotation angles in the directions indicated by arrows d, which are opposite to each other, by the right and left worms. Then, the tension spring 51 is pulled by the stop pin 52 of the worm wheel 44, so that the drive arm 46 is rotated in the same direction as the worm wheel 44, while the arm 46 is in the state of abutting against the top pins 52. The drive arm 46 urges the stop pin 55 of the the sliding support 29 in a direction indicated by arrow f through the drive arms 47.

As a result, the sliding support 29 is guided by and slides on the pair of guide shafts 32, 33 in the direction indicated by arrow Za, and the center of the reel table 28 is conveyed to the position $P_6$. Then, the center distance between the tables 28 is automatically adjusted to short spacing $l_4$. At the same time when the center of the table 28 is located at position $P_6$ as shown in FIG. 3B, one end 29a of the sliding support 29 abuts against the other end portion 34b of the support table 34 and stops, but the worm wheel 44 continues to rotate in the direction indicated by arrow d, so that the tension spring 51 is strongly pulled in the direction given by arrow d, unitl the sensor 58 detects the rotational position of the worm wheel 44, and stops the drive motor 39. Therefore, the tension force of the tension spring 51 serves to hold accurately the center of the reel table 28 at position $P_6$, and further, the worm wheel 44 is locked by the worm 43.

As shown in FIG. 3B, when the center of the table 28 is located at position $P_6$, and the large cassette 1 is inserted in the cassette holder 15, the sensors 22 and 23 are turned on, and the drive motor 39 is so driven in the reverse direction to move the reel table 28 in the direction indicated by arrows Zb. That is, the motor shaft 40 of the drive motor 39 is rotated in the direction indicated by arrow g as shown in FIG. 5B, and the right and left worm wheels 44 are rotated by the same amount of rotation angles in the directions indicated by arrows h, which are opposite to each other, by the right and left worms 43, respectively. The stop pin 52 of the worm wheel 44 is brought into abutment with the drive arm 46, and the drive arm 46 is rotated in the same direciton as the worm wheel 44. The tension spring 56 is pulled by the pivot pin 53 of the drive arm 46, so that the stop pin 55 of the sliding support 29 is pulled in the direction indicated by arrows i.

As a result, the sliding support 29 is guided by the pair of guide shafts 32 and 33 and slides in the direction indicated by arrow Zb. Then, the center of the reel table 28 is moved to position $P_5$ as shown in FIG. 3A. The center distance between the reel tables 28 is automatically adjusted to the long spacing $l_3$.

In this case, when the center of the reel table 28 is conveyed to position $P_5$ as shown in FIG. 5A, one end portion 29a of the sliding support 29 is stopped by one end portion 34a of the support table 34. However, the worm wheel 44 continues to rotate in the direction indicated by arrow h, so that the tension spring 56 is strongly pulled by the pivot pins 53 in the direciton indicated by arrow i, until the sensor 59 detects the rotational position of the worm wheel 44 and is turned on, and then the drive motor 39 is stopped. Therefore, the tension force of the tension spring 56 serves to hold accurately the center of the reel table 28 at position $P_5$, and further, the worm wheel 44 is locked by the worm 43.

According to the space adjustment between reel tables mechanism 26 of the present invention, the size of the cassette 1, 7 optionally inserted in the cassette holder 15 is detected, and then, the center distance between the reel tables 28 is automatically adjusted to the long or short distance $l_3$, $l_4$ in accordance with the size of the inserted cassette 1, 7 before the inserted cassette 1, 7 is conveyed by the cassette holder 15 to and mounted in the cassette loading position. If the cassette is ejected through a process indicated by arrow b in FIGS. 2A and 2B, the reel table 28 is kept in the position that is occupied before the cassette begins to be ejected. However, it is possible to automatically shift the reel table 28 to any position in accordance with the type of cassette which is more frequently used.

The present invention is not limited to the cassette video tape recorder but can be extended to any other cassette tape recording and/or recording apparatus. In addition, the pair of reel tables 28 need not be moved along the lines symmetrically inclined against each other as indicated by arrows Za and Zb, but can be moved along a straight line. Or only one of the reel tables 28 may be moved.

In the above embodiment, the distance between the centers of the reel tables 28 is adjusted in accordance with the two types of large and small cassette 1, 7. However in case of the present invention, the above distance may be adjusted to more than three of large, medium and small steps.

Furthermore, in the above embodiment, the distance between the centers of the reel tables 28 is adjusted in accordance with the two types of large and small cassettes 1, 7 whose center distances between the reels differ from each other. However, the present invention can also be applied to the case wherein the distance between the centers of the reel tables is adjusted in accordance with various types of cassette, the sizes of which are the same but whose center distances between the reels differ from one another.

The space adjustment between reel tables mechanism 26 in the above embodiment is operated in such a way that the sliding support 29 of the reel table 28 is moved through the worm 43 and worm wheel 44 driven by the drive motor 39. However, the sliding support 29 may be moved through solenoid operated plungers on other various types of mechanism.

The apparatus of the present invention is such that when any of the various types of tape cassette having the different center distances between the reels is optionally inserted in the cassette video type recorder, the type of the inserted tape cassette is detected by the sensors, and the distance between the centers of the reel tables is automatically adjusted in accordance with this inserted cassette.

Therefore according to the present invention, any of the various types of tape cassette whose center distances between the reels differ from one another can be optionally and directly mounted in the apparatus for recording or reproducing without any special parts like an adaptor, which are necessary for the conventional apparatus, so that the trouble for use and high cost of production due to the use of the special parts are all avoidable. In addition, it is easy to use an automatic cassette changer for optionally loading any of a plurality of tape cassettes onto the recording and/or reproducing apparatus.

Accordingly, when the present invention is, for example, applied to a video system or the like in a broadcasting station, it becomes possible to develop an automatic sending system of commercials and programs through the use of two cassette tapes; one played for a short time and the other played for a long time.

I claim:

1. A cassette tape recording and/or reproducing apparatus capable of mounting optionally any of various types of tape cassette, each of said types including a pair of reels and the pair of reels of each type having a center-to-center distance that differs from the center-to-center distance between the reels of other types; and the apparatus comprising:
    a pair of reel tables capable of engaging with and driving said pair of reels, respectively;
    detecting means to discriminate among said tape cassettes of said various types; and
    adjusting means responsive to said detecting means for moving said pair of reel tables to adjust the center-to-center distance therebetween, whereby the center-to-center distance between said pair of reel tables is adjusted in accordance with a selected one of said tape cassettes.

2. Apparatus according to claim 1 further comprising a pair of reel motors respectively directly driving said pair of reel tables.

3. Apparatus according to claim 2 wherein each of said reel tables is slidably mounted on a pair of respective guide rails and moved linearly together with said pair of reel motors.

4. Apparatus according to claim 3 wherein said pair of guide rails are inclined by equal and opposite angles with respect to a median plane therebetween and said pair of reel tables are simultaneously moved along said pair of guide rails.

5. Apparatus according to claim 4 wherein each of said motors comprises a motor shaft and each of said pair of guide rails comprises a pair of guide shafts parallel to each other, and a pair of sliding supports slidably movable along said pair of guide rails, each of said reel motors being mounted on one of said sliding supports, and each of said reel tables being secured to one of said motor shafts.

6. Apparatus according to claim 5 wherein said detecting means comprises a plurality of sensors producing an output, and said adjusting means is controlled on the basis of said output.

7. Apparatus according to claim 6 further comprising a pair of space adjustment means for adjustably moving said pair of sliding supports and a motor for simultaneously driving said pair of space adjustment means, said motor being controlled on the basis of said output.

* * * * *